(12) United States Patent
Tsuji

(10) Patent No.: US 9,229,708 B2
(45) Date of Patent: Jan. 5, 2016

(54) SOFTWARE-DEVELOPING STRUCTURED-DATA-FILE CREATING APPARATUS AND METHOD CAPABLE OF EFFICIENTLY CREATING DATA FILE USED IN DEVELOPING PROGRAM FOR DEVICE

(71) Applicant: KYOCERA Document Solutions Inc., Osaka (JP)

(72) Inventor: Chika Tsuji, Osaka (JP)

(73) Assignee: KYOCERA Document Solutions Inc. (JP)

( * ) Notice: Subject to any disclaimer, the term of this patent is extended or adjusted under 35 U.S.C. 154(b) by 374 days.

(21) Appl. No.: 13/779,100

(22) Filed: Feb. 27, 2013

(65) Prior Publication Data

US 2013/0227523 A1    Aug. 29, 2013

(30) Foreign Application Priority Data

Feb. 28, 2012  (JP) .................. 2012-041827

(51) Int. Cl.
*G06F 9/44* (2006.01)
(52) U.S. Cl.
CPC ................ *G06F 8/70* (2013.01); *G06F 9/4411* (2013.01); *G06F 9/4446* (2013.01)
(58) Field of Classification Search
None
See application file for complete search history.

(56) References Cited

U.S. PATENT DOCUMENTS

| | | | | |
|---|---|---|---|---|
| 5,964,872 A * | 10/1999 | Turpin | ............................. | 713/1 |
| 7,395,533 B2 * | 7/2008 | Suzuki | .......................... | 717/174 |
| 7,941,655 B1 * | 5/2011 | Kaul et al. | ........................ | 713/1 |
| 8,196,143 B2 * | 6/2012 | Bavaria et al. | ................ | 718/104 |
| 2002/0156947 A1 * | 10/2002 | Nishio | .................. | G06F 9/4411 710/36 |
| 2004/0210680 A1 * | 10/2004 | Yamamura et al. | ............... | 710/8 |
| 2004/0215748 A1 * | 10/2004 | Boonie et al. | ................. | 709/220 |
| 2004/0250247 A1 * | 12/2004 | Deeths et al. | ................. | 717/175 |
| 2005/0200873 A1 * | 9/2005 | Yamakawa et al. | .......... | 358/1.13 |
| 2007/0076247 A1 * | 4/2007 | Mori | ..................... | G06F 3/1204 358/1.15 |
| 2009/0157906 A1 * | 6/2009 | Yanagi | .................. | G06F 3/1205 710/5 |
| 2009/0228579 A1 * | 9/2009 | Sanghvi et al. | ............... | 709/224 |
| 2010/0058360 A1 * | 3/2010 | Asai | .............................. | 719/321 |
| 2010/0225957 A1 * | 9/2010 | Liu | ............................. | 358/1.15 |
| 2010/0309519 A1 * | 12/2010 | Nishihara | ............. | G06F 3/1204 358/1.15 |

FOREIGN PATENT DOCUMENTS

JP         10-307715        11/1998

* cited by examiner

*Primary Examiner* — Jason Mitchell
*Assistant Examiner* — Christine Dang
(74) *Attorney, Agent, or Firm* — McDonnell Boehnen Hulbert & Berghoff LLP

(57) ABSTRACT

A software-developing structured-data-file creating apparatus of the present disclosure includes a storage unit configured to store a specification list comprising specific values associated with a plurality of individual items indicative of specifications of a device and a location-path list comprising location paths associated with individual portions of the plurality of individual items. The software-developing structured-data-file creating apparatus also includes an input unit, configured to associate common portions of the location paths. The software-developing structured-data-file creating apparatus additionally includes a structured-data-file creating unit configured to create a data file comprising the common portions of the location paths in the location-path. The corresponding values in the specification list are added to the individual location paths.

1 Claim, 14 Drawing Sheets

20 SPECIFICATION LIST

| | A | B | C | D | |
|---|---|---|---|---|---|
| 1 | MODEL NAME | MPF2010A | MPF2012A | MPF2012X | ............... |
| 2 | CATEGORY | A | A | X | ............... |
| 3 | PDL | PCL 5E<br>KPDL3.0 | XPS<br>PCL 5E<br>KPDL3.0 | XPS<br>PCL 5E<br>KPDL3.0 | ............... |
| 4 | PAPER SIZE | Letter<br>A4<br>A5 | Letter<br>A4<br>A5 | Letter<br>A3<br>A4<br>A5 | ............... |
| 5 | FEEDING PAPER | Auto<br>Cassette 1-3 | Auto<br>Cassette 1-5 | Auto<br>Cassette 1-5 | ............... |
| 6 | READING RESOLUTION | 600dpi<br>300dpi | 1200dpi<br>600dpi<br>300dpi | 1200dpi<br>600dpi<br>300dpi | ............... |
| 7 | PRINTING SPEED | 40ppm | 45ppm | 60ppm | ............... |
| 8 | STAPLE | N/A | N/A | N/A | ............... |
| ⋮ | ⋮ | ⋮ | ⋮ | ⋮ | ⋮ |

FIG. 2

30 LOCATION-PATH LIST

| | A | B | C | |
|---|---|---|---|---|
| 1 | SOFTWARE KIND | PTR_DRIVER | UTIL1 | ............ |
| 2 | CATEGORY | | | ............ |
| 3 | PDL | Device/PDL | | ............ |
| 4 | PAPER SIZE | Paper/Size | Device/Print/Paper/Size | ............ |
| 5 | FEEDING PAPER | Paper/Source | Device/Print/Paper/Source | ............ |
| 6 | READING RESOLUTION | Imaging/Resolution | Device/Print/Quality | ............ |
| 7 | PRINTING SPEED | General/Speed | Device/Print/Speed | ............ |
| 8 | STAPLE | | Finishing/Staple | ............ |
| ⋮ | ⋮ | ⋮ | ⋮ | ⋮ |

FIG. 3

41 EDITION TARGET TABLE

|   | A | B | C |
|---|---|---|---|
| 1 | SOFTWARE KIND | PTR_DRIVER | MPF2012A |
| 2 | CATEGORY |  | A |
| 3 | PDL | Device/PDL | XPS<br>PCL 5E<br>KPDL3.0 |
| 4 | PAPER SIZE | Paper/Size | Letter<br>A4<br>A5 |
| 5 | FEEDING PAPER | Paper/Source | Auto<br>Cassette 1-5 |
| 6 | READING RESOLUTION | Imaging/Resolution | 1200dpi<br>600dpi<br>300dpi |
| 7 | PRINTING SPEED | General/Speed | 45ppm |
| 8 | STAPLE | Finishing/Staple | N/A |
| ⋮ | ⋮ | ⋮ | ⋮ |

[ OK ] [ CANCEL ]

FIG. 9

430 XML FILE

```xml
<?xml version="1.0" ?>
<driver xmlns="http://www.mfp_maker.com/product/driver">
          <Name>PTR_DRIVER</Name>
          <Model>MPF2012A</Model>
          <Device>
                    <PDL>XPS</PDL>
                    <PDL>PCL 5E</PDL>
                    <PDL>KPDL3.0</PDL>
                    ⋮
          </Device>
          <Paper>
                    <Size>Letter</Size>
                    <Size>A4</Size>
                    <Size>A5</Size>
                    <Sorce>Auto</Sorce>
                    <Sorce>Casette 1-5</Sorce>
                    ⋮
          </Paper>
                    ⋮
</product>
```

FIG. 10

20A SPECIFICATION AND LOCATION-PATH LIST

| | A | B | C | XA | XB | XC | |
|---|---|---|---|---|---|---|---|
| 1 | SOFTWARE KIND | PTR_DRIVER | UTIL1 | MPF2010A | MPF2012A | MPF2012X | ............ |
| 2 | CATEGORY | | | A | A | X | ............ |
| 3 | PDL | Device/PDL | | PCL 5E<br>KPDL3.0 | XPS<br>PCL 5E<br>KPDL3.0 | XPS<br>PCL 5E<br>KPDL3.0 | ............ |
| 4 | PAPER SIZE | Paper/Size | Device/Print/Paper/Size | Letter<br>A4<br>A5 | Letter<br>A4<br>A5 | Letter<br>A3<br>A4<br>A5 | ......... |
| 5 | FEEDING PAPER | Paper/Source | Device/Print/Paper/Source | Auto<br>Cassette 1-3 | Auto<br>Cassette 1-5 | Auto<br>Cassette 1-5 | ............ |
| 6 | READING RESOLUTION | Imaging/Resolution | Device/Print/Quality | 600dpi<br>300dpi | 1200dpi<br>600dpi<br>300dpi | 1200dpi<br>600dpi<br>300dpi | ............ |
| 7 | PRINTING SPEED | General/Speed | Device/Print/Speed | 40ppm | 45ppm | 60ppm | ............ |
| 8 | STAPLE | Finishing/Staple | | N/A | N/A | N/A | ......... |
| ... | ......... | ......... | ......... | ......... | ......... | ......... | |

41A EDITION TARGET TABLE

45 REFERENCE

| | A | B | C | D |
|---|---|---|---|---|
| 1 | SOFTWARE KIND | PTR_DRIVER | MPF2012A | PTR_DRIVER_MPF2012X |
| 2 | CATEGORY | | A | |
| 3 | PDL | Device/PDL | XPS<br>PCL 5E<br>KPDL3.0 | Device/PDL |
| 4 | PAPER SIZE | Paper/Size | Letter<br>A4<br>A5 | Paper/Size |
| 5 | FEEDING PAPER | Paper/Source | Auto<br>Cassette 1-5 | Paper/Source |
| 6 | READING RESOLUTION | Imaging/Resolution | 1200dpi<br>600dpi<br>300dpi | Imaging/Resolution |
| 7 | PRINTING SPEED | General/Speed | 45ppm | General/Speed |
| 8 | STAPLE | ......... | N/A | Finishing/Staple |
| ... | ......... | ......... | ......... | ......... |

[ OK ]  [ CANCEL ]

_SOFTWARE-DEVELOPING STRUCTURED-DATA-FILE CREATING APPARATUS AND METHOD CAPABLE OF EFFICIENTLY CREATING DATA FILE USED IN DEVELOPING PROGRAM FOR DEVICE_

INCORPORATION BY REFERENCE

This application is based upon, and claims the benefit of priority from, corresponding Japanese Patent Application No. 2012-041827, filed in the Japan Patent Office on Feb. 28, 2012, the entire contents of which is incorporated herein by reference.

FIELD

The present disclosure relates to a software-developing structured-data-file creating apparatus and method capable of efficiently creating a data file used in developing a program for a device.

BACKGROUND

When developing programs for a driver, a utility, etc. of an image forming apparatus, developers create data files for use in the programs. Generally, developers create the data files by editing similar old program data-files that already reference the specifications of the image forming apparatus.

However, creating data files in the above-referenced manner may be slow, and mistakes, such as a typographical errors and/or forgetting to incorporate some changes, may occur. Accordingly, this may cause the developer to re-edit the program-data-files, when—for example—finding such or similar mistakes during debugging, which can cause a delay in developing the program.

SUMMARY

The present disclosure relates to a software-developing structured-data-file creating apparatus and method in which a data file for use in developing a program for a device can be provided with a data structure suitable for the program and can be created with efficiency.

In one embodiment, a software-developing structured-data-file creating apparatus is disclosed. The software-developing structured-data-file creating apparatus includes a storage unit configured to store a specification list comprising specific values associated with a plurality of individual items indicative of specifications of a device and a location-path list comprising location paths associated with individual portions of the plurality of individual items. Each location path of the location paths comprises a first tree structure. The software-developing structured-data-file creating apparatus also includes an input unit, configured to associate common portions of the location paths. The software-developing structured-data-file creating apparatus additionally includes a structured-data-file creating unit configured to create a data file comprising the common portions of the location paths in the location-path. The corresponding values in the specification list are added to the individual location paths, and the data file includes a second tree structure.

In another embodiment, a method for creating a software-developing structured data file is disclosed. The method includes storing a specification list comprising specific values associated with a plurality of individual items indicative of specifications of a device and a location-path list comprising location paths associated with individual portions of the plurality of items. The location paths include a first tree structure. The method also includes creating a data file comprising common portions of the location paths in the location-path. The corresponding values in the specification list are added to the individual location paths, and the data file comprises a second tree structure.

Additional features and advantages are described herein, and will be apparent from the following Detailed Description and the figures.

BRIEF DESCRIPTION OF FIGURES

In the accompanying drawings:

FIG. 2 illustrates a schematic diagram of a specification list of an image forming apparatus;

FIG. 3 illustrates a schematic diagram of a location-path list by software kind;

FIG. 9 illustrates a schematic diagram of an edition target table;

FIG. 10 illustrates a schematic diagram of a description of an XML file created by the software-developing structured-data-file creating apparatus;

FIG. 12 illustrates a schematic diagram of a specification and location-path list;

FIG. 14 illustrates a diagram of a screen that displays an edition target table of the second embodiment.

DETAILED DESCRIPTION

First Embodiment

Figure 1:
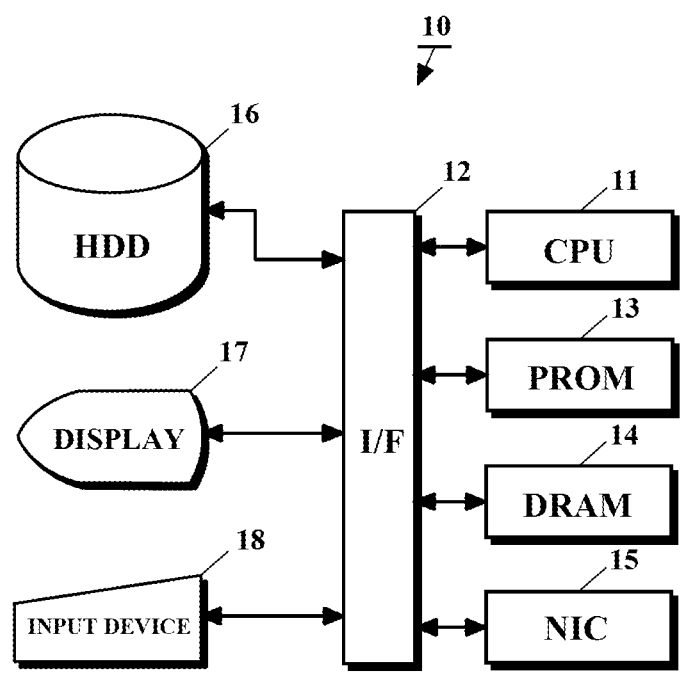
FIG. 1 illustrates a block diagram of a configuration of hardware of a software-developing structured-data-file creating apparatus according to a first embodiment of the present disclosure.

FIG. 1 illustrates a block diagram of the configuration of hardware of a software-developing structured-data-file creating apparatus 10.

The software-developing structured-data-file creating apparatus 10 includes a CPU 11, a PROM 13, a DRAM 14, a network interface card (NIC) 15, an auxiliary storage unit 16 (e.g. a HDD), a display 17, and an input device 18, which are connected together via an interface 12. In FIG. 1, block 12 represents a plurality of different kinds of interfaces.

PROM 13 may be a flash memory, which stores a basic input/output system (BIOS). However, other types of memory may be used as PROM 13 as well. DRAM 14 may be used as a main storage unit. Storage unit 16 stores an operating system (OS) that causes the apparatus to function as the software-developing structured-data-file creating apparatus 10, various drivers, applications, and/or data. Input device 18 includes, for example, a keyboard and a pointing device.

In the present disclosure, the software to be developed generally applies to devices including a printer driver, a scanner driver, and a facsimile driver for an image forming apparatus. The software also applies to utilities for managing printing or managing consumable items. Specifications of the devices are determined as a precondition for using the software-developing structured-data-file creating apparatus 10, and data for each item of the specifications is constructed as a database.

To automatically create a data file with a tree structure, in accordance with the kind of software to be developed, items used in the target software (i.e., program to be developed) are extracted from the plurality of items of the specifications, and the location paths in the tree structure are associated with the individual extracted items in advance. A data file, in which common portions of the location paths are collected into one tree structure and in which the values of corresponding items in the data of the specifications are added to the individual location paths, is created as a data file for developing software for the image forming device using a program.

The software-developing structured data file is directly used in the target software or indirectly used after its data format is converted.

FIG. 2 illustrates a schematic diagram of an example specification list of an image forming apparatus.

The specification list 20, which includes a plurality of models of the image forming apparatus is created in advance, as shown in FIG. 2. The specification list 20 is a spreadsheet, created using spreadsheet software, in which various information about the different models of the image forming apparatus can be found. The various information associated with the device specifications are specified in column A, and the values corresponding to the various items are specified in the remaining columns. Accordingly, for example, the various model names of the image forming apparatus may be found in row 1, columns B-(N). For example, a cell on row 4 and in column C (4, C) is an image forming apparatus having model name "MPF2012A" and having available paper sizes of "letter", "A4", and "A5". Likewise, a cell (6, D) is an image forming apparatus having model name "MPF2012X" and having selectable reading resolutions "1200 dpi", "600 dpi", and "300 dpi". Note, N/A indicates that the cells are unavailable, and "Category" indicates the kind of the model.

FIG. 3 illustrates a schematic diagram of a location-path list 30 by software kind.

The location-path list 30 by kind of target software may be created in advance.

In FIG. 3, "Software kind" demarcated in location-path list 30 indicates the name of the location-path used in common by the individual models. For example, column B specifies the location paths of individual items that are generally used in a printer driver (PTR_DRIVER). For some models, there are location paths to be added and/or deleted during edition of the location-path list 30.

The location-path list 30 is also a spreadsheet in which location paths of various items are specified. The item names of the device specifications are set in column A, and software kind names are set on row 1. Location paths are set in the remaining cells. For example, a cell (4, B) indicates that software kind name is PTR_DRIVER, that the location path of item "paper size" is "Paper/Size". As another example, cell (6, C) indicates that software kind name is "UTIL1" and that the location path of item "reading resolution" is "Device/Print/Quality". The blank cells indicate that the items are not used.

When a model is selected, corresponding individual location paths are associated with corresponding values for the same items of the model in the specification list 20.

Figure 4:
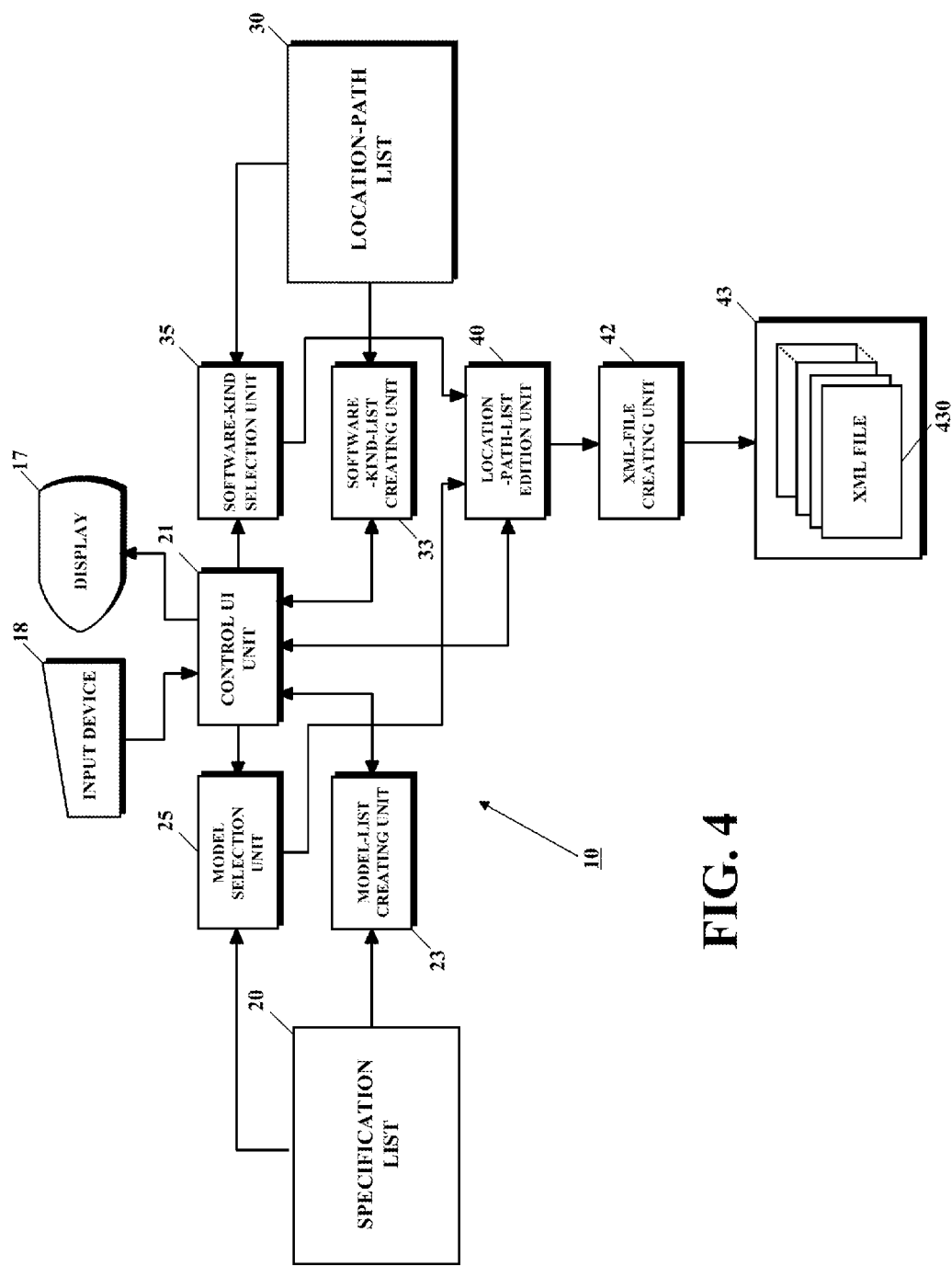
FIG. 4 illustrates a block diagram of a functional configuration of the software-developing structured-data-file creating apparatus.

FIG. 4 illustrates a block diagram of the functional configuration of the software-developing structured-data-file creating apparatus 10.

The specification list 20 and the location-path list 30 are stored in advance in the HDD 16 of FIG. 1. A control UI unit 21, a model-list creating unit 23, a model selection unit 25, a software-kind-list creating unit 33, a software-kind selection unit 35, a location-path-list edition unit 40, and an XML-file creating unit 42, represent a program and hardware that may be used by the program. XML files 430 are created by the XML-file creating unit 42 and are stored in the HDD 16 as elements of an XML file group 43. XML files 430 are created by a user and input via the input device 18 and the display 17.

Figure 5:
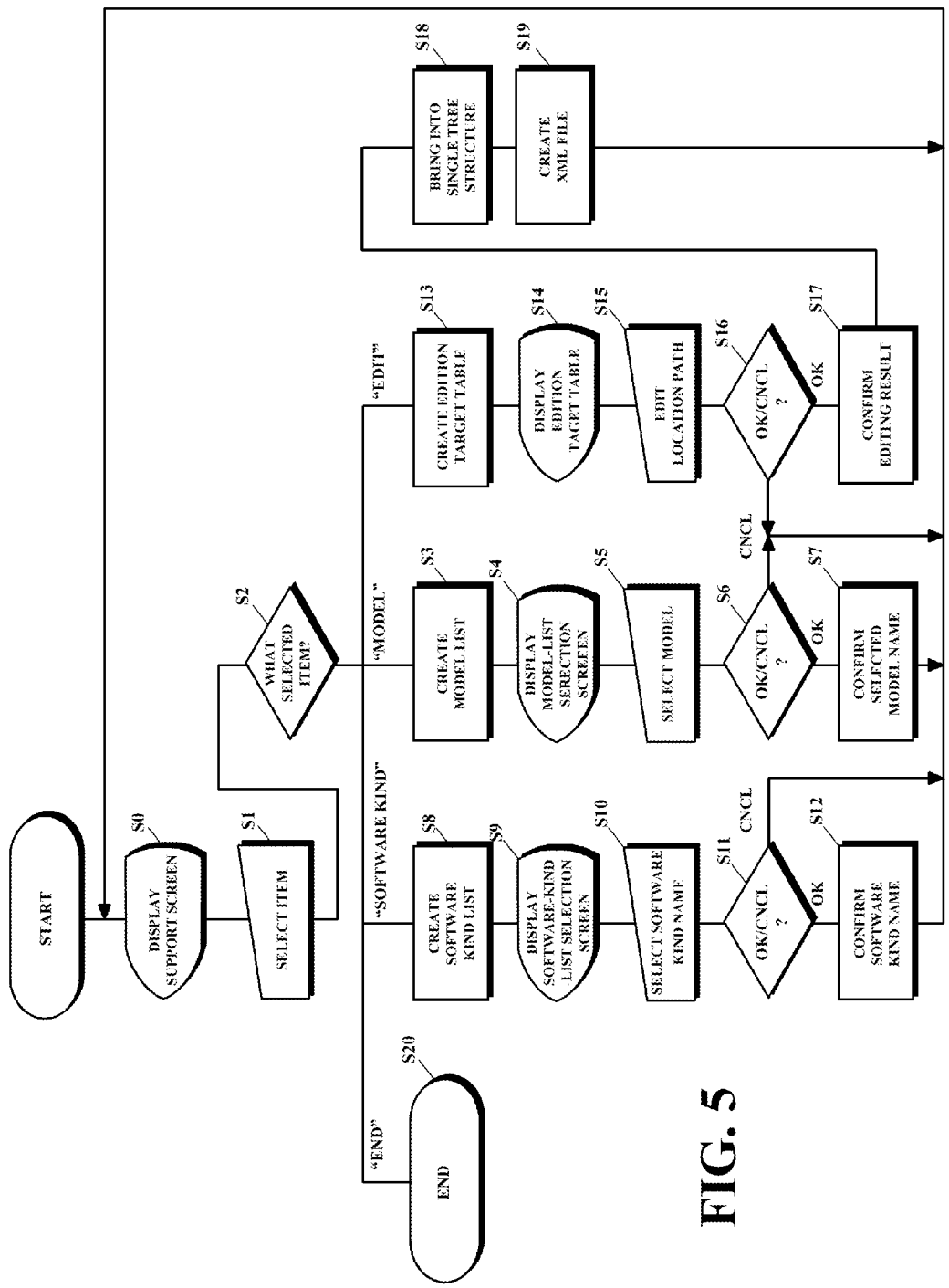
FIG. 5 illustrates a flowchart of software process of the software-developing structured-data-file creating apparatus.

FIG. 5 illustrates a flowchart of the software processing procedure of the software-developing structured-data-file creating apparatus 10.

The process, represented by steps S0 to S2, is performed by the control UI unit 21 shown in FIG. 4.

Figure 6:
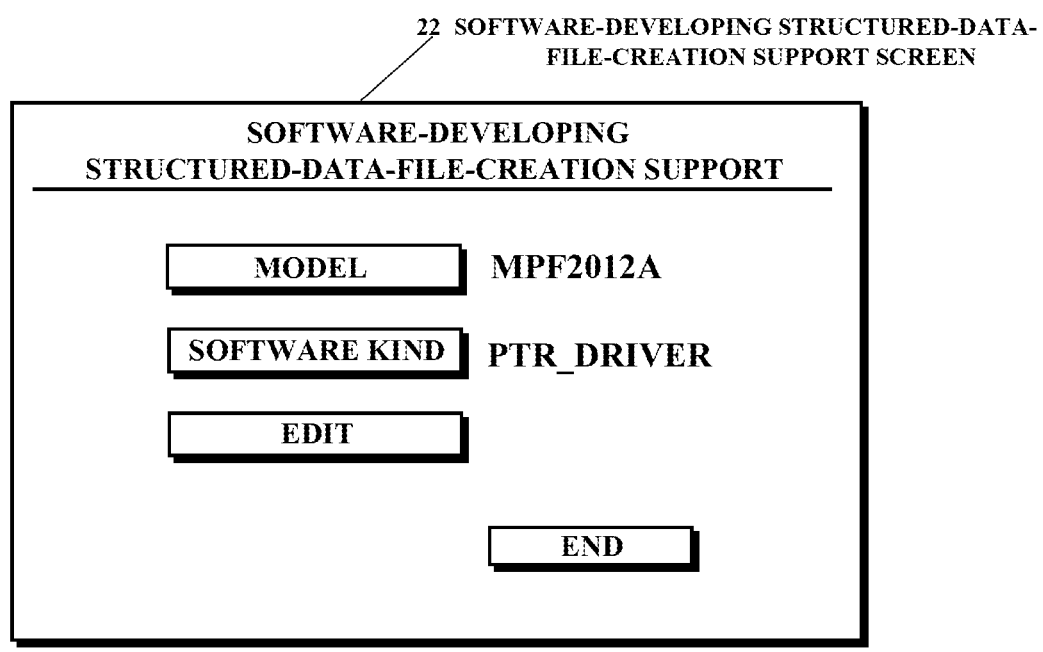
FIG. 6 illustrates a schematic diagram of a configuration of a software-developing structured-data-file-creation support screen.

At step S0, when the software is started, a software-developing structured-data-file-creation support screen 22, as shown in FIG. 6, is displayed on the display 17 via the control UI unit 21. "MODEL", "SOFTWARE KIND", "EDIT", and "END" are displayed as menu items, and are each configured as a software button.

When one of the software buttons is pressed by the user via the input device 18 in step S1, step S1 proceeds to step S2.

If "MODEL", "SOFTWARE KIND", or "EDIT" is selected, the corresponding model-list creating unit 23, the software-kind-list creating unit 33, or the location-path-list edition unit 40 is called via the control UI unit 21, and step S2 proceeds to one of step S3, S8, or S13. If "END" is selected, step S2 proceeds to step S20.

At step S3, the model-list creating unit 23 reads the values of cells starting with cell (1, B) in the specification list 20 shown in FIG. 2 and creates an object corresponding to the model list.

Figure 7:
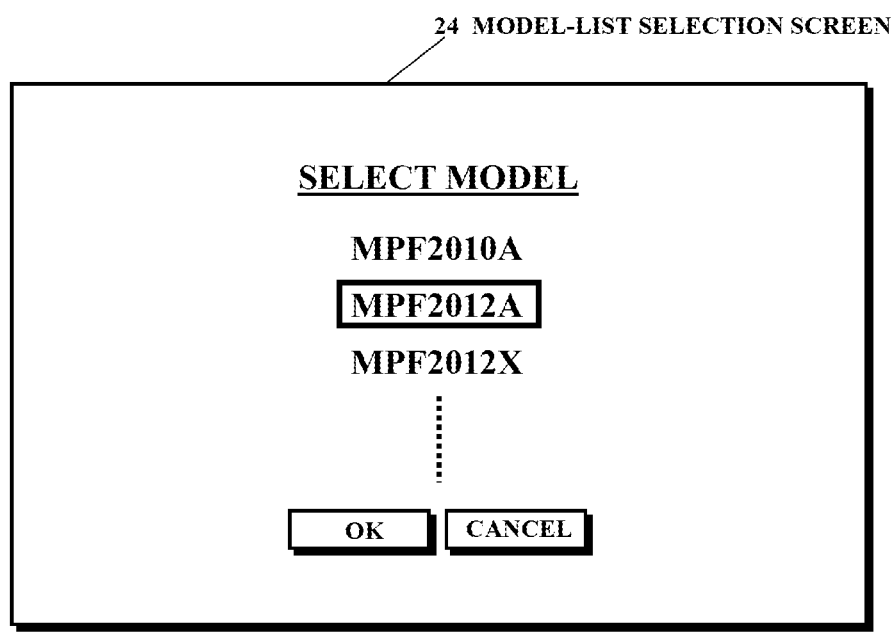
FIG. 7 illustrates a schematic diagram of a model-list selection screen.

At step S4, the model-list creating unit 23 displays the details of the object as a model-list selection screen 24, as shown in FIG. 7, on the display 18 via the control UI unit 21.

At steps S5 and S6, one of the models in the model-list selection screen 24 is selected by the user via input device 18. The selected model name may be enclosed by a rectangle via the control UI unit 21, as shown in FIG. 7. In FIG. 7, model "MPF2012A" is shown selected. The model-list selection screen 24 further includes an "OK" button and a "CANCEL" button. If the "OK" button is pressed, step S6 proceeds to step S7, and if the "CANCEL" button is pressed, step S6 returns to step S0.

At step S7, the model selection unit 25 confirms the selected model name by storing the model name in HDD 16, and at step S7, returns to step S0. The confirmed model name is displayed at the side of the "MODEL" button on the software-developing structured-data-file-creation support screen 22, as shown in FIG. 6, via the control UI unit 21.

At step S8, the software-kind-list creating unit 33 reads the details of the cells starting with cell (1, B) in the location list 30 shown in FIG. 3 and creates an object corresponding to the software kind list.

Figure 8:
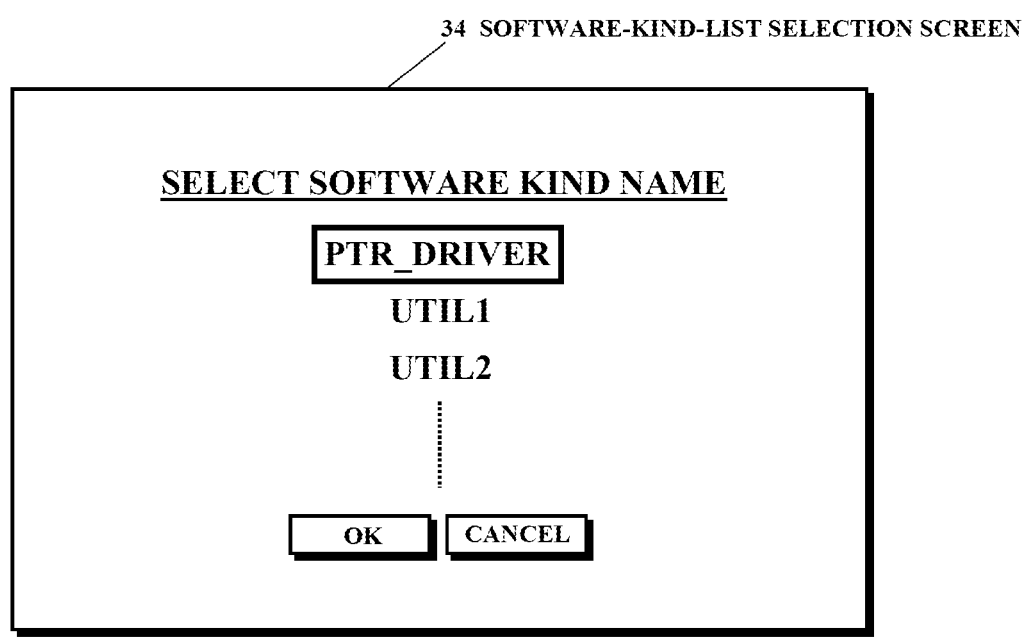
FIG. 8 illustrates a schematic diagram of a software-kind-list selection screen.

At step S9, the software-kind-list creating unit 33 displays the details of the object on the display 17 as a software-kind-list selection screen 34, as shown in FIG. 8, via the control UI unit 21.

At steps S10 and S11, one of the software kinds displayed on the software-kind-list selection screen 34 is selected by the user via the input device 18. The selected software kind name may be enclosed by a rectangle, as shown in FIG. 8, via the control UI unit 21. In FIG. 8, "PTR_DRIVER" is shown selected. The software-kind-list selection screen 34 further includes an "OK" button and a "CANCEL" button. If the "OK" button is pressed, step S11 proceeds to step S12, and if the "CANCEL" button is pressed, step S11 returns to step S0.

At step S12, the software-kind selection unit 35 confirms the selected software kind name by storing the software kind name in HDD 16, and at step S12, returns to step S0. At that time, the confirmed software kind name is displayed at the side of the "software kind" button on the software-developing structured-data-file-creation support screen 22, as shown in FIG. 6, via the control UI unit 21.

At step S13, the location-path-list edition unit 40 acquires the column of the model selected by the model selection unit 25 from the specification list 20 and the column of the software kind from the location-path list 30 selected by the software-kind selection unit 35. The location-path-list edition unit 40 creates an edition target table 41 in which they are combined, as shown in FIG. 9. Columns A to C on the edition target table 41 are the same as column B in the specification list 20 and column A and column B in the location-path list 30, respectively.

At step S14, the location-path-list edition unit 40 displays the edition target table 41 on the display 18 via the control UI unit 21.

At steps S15 and S16, the location-path list in column B on the edition target table 41 is set in common among the models, in which a location path needs to be written in a blank cell, or a set location path needs to be deleted corresponding to the selected model. The location-path-list edition unit 40 performs editing, such as writing and/or deleting via a user operation via the input device 18. If the "OK" button or "CANCEL" button is pressed without or after editing, step S16 proceeds to step S17 or step S0.

At step S17, the location-path-list edition unit 40 stores the description of the edition target table 41 in HDD 16, and thereby confirming an editing result.

At step S18, the XML-file creating unit 42 brings together common portions of all the location paths after editing into a single tree structure.

At step S19, the XML-file creating unit 42 creates an XML file 430, as shown in FIG. 10, by further writing the value of corresponding items to the individual location paths and stores the XML file 430 in HDD 16. At that time, if one item includes a plurality of rows of values, the XML-file creating unit 42 creates brother elements, with the rows as the values of text nodes of the elements. The name of the XML file 430 includes a software kind name and a model name, for example, PTR_DRIVER_MFP2012A.XML. Once the XML file has been created, step S19 returns to step S0.

At step S20, the process performed by the software in the software-developing structured-data-file creating apparatus 10 shown in FIG. 5 ends.

The processes in steps S18 and S19 need not be divided but may be a single process. In other words, elements in which the values of corresponding items of the location paths are used as text nodes may be generated while common portions are being brought together.

According to the first embodiment, common portions of the location paths in the edited location-path list are brought together via the XML-file creating unit 42 into the single tree structure, and an XML file in which values corresponding to the individual location paths in the model list are added to the individual location paths is created. Accordingly, the description is formed into the data structure suitable for the program, and when the list is added to one or both of the specification list 20 and the location-path list 30, the software-developing structured data file is efficiently created by combining them.

Additionally, the structured data file corresponding to the model of the image forming apparatus can easily be created via the location-path-list edition unit 40.

Moreover, since the model of the image forming apparatus is selected, and the software kind is selected, the software-developing structured data file with a desired combination thereof may be efficiently created.

Furthermore, since the spreadsheet with a configuration suitable for the specification list 20 and the location-path list 30 is used, a simpler program configuration can be achieved.

When a plurality of values are associated with one item in the specification list 20, the plurality of values are used as the values of text nodes of brother elements, and thus, the configuration of the XML file 430 can be simplified.

Second Embodiment

Figure 11:
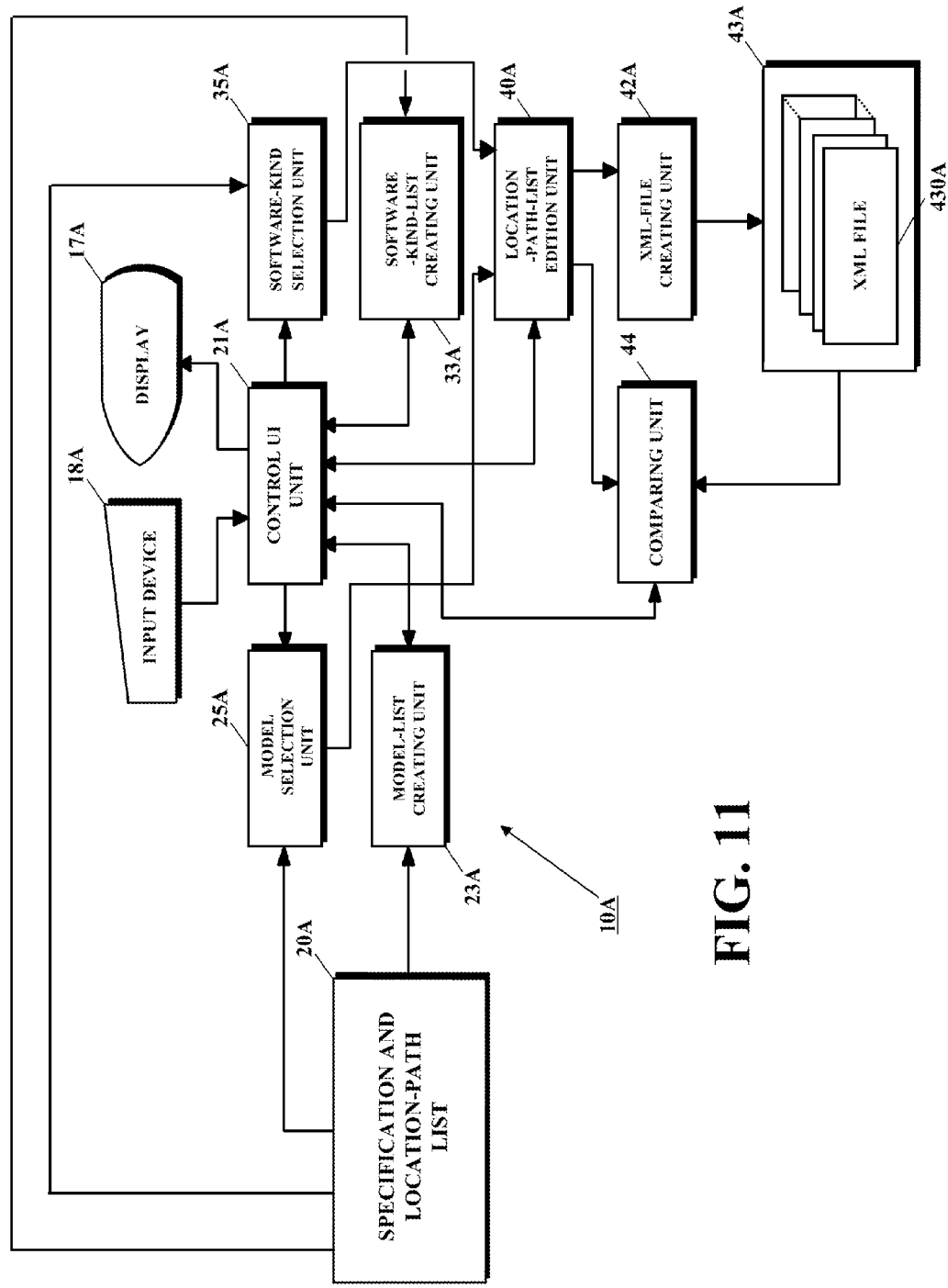
FIG. 11 illustrates a schematic diagram of a functional configuration of the software-developing structured-data-file creating apparatus according to a second embodiment of the present disclosure.

FIG. 11 illustrates a block diagram of the functional configuration of a software-developing structured-data-file creating apparatus 10A according to the second embodiment of the present disclosure.

The software-developing structured-data-file creating apparatus 10A uses a specification and location-path list 20A, as shown in FIG. 12, instead of the specification list 20 and the location-path list 30 used in the first embodiment (shown in FIG. 2 and FIG. 3, respectively). Furthermore, the software-developing structured-data-file creating apparatus 10A further includes a comparing unit 44. An XML-file creating unit 42A creates a file, for example, in a CSV format, of the description of column B corresponding to an XML file in an edition target table 41A shown in FIG. 14. The main portion of the file name is associated with the XML file (for example, the same portion is used). The XML file is stored in an auxiliary storage unit, such as HDD 16 of the first embodiment shown in FIG. 1.

As shown in FIG. 12, the specification and location-path list 20A is a combination of the specification list 20 in FIG. 2 and the location-path list 30 in FIG. 3. Accordingly, column A in specification and location-path list 20A represents both column A of the specification list 20 and column A of the location-path list 30. In FIG. 11, reference numerals 17A, 18A, 21A, 23A, 25A, 33A, 35A, 40A, 42A, 43A, and 430A are equivalent to reference numerals 17, 18, 21, 23, 25, 33, 35, 40, 42, 43, and 430 shown in FIG. 4, respectively.

Figure 13:
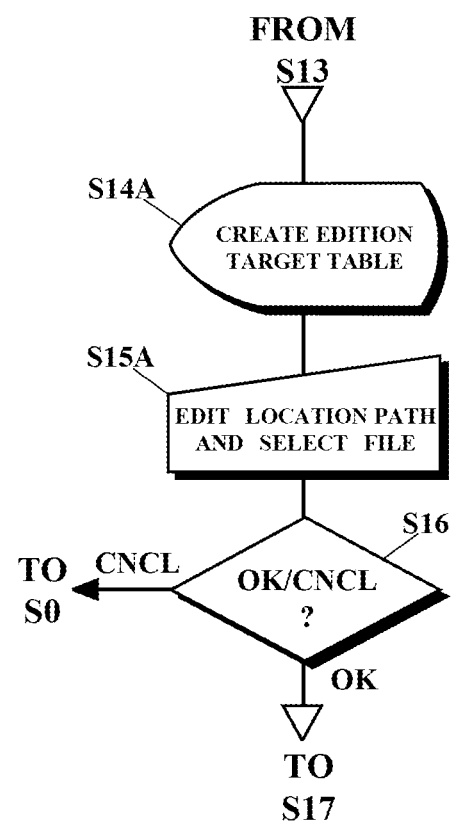
FIG. 13 illustrates a partial flowchart of steps performed in the second embodiment instead of steps S14 to S16 of the first embodiment shown in FIG. 5.

FIG. 13 is a partial flowchart showing steps S14A to S16, which are performed in the second embodiment instead of steps S14 to S16 of the first embodiment shown in FIG. 5. The processes of steps other than steps S14A to S16 in the second embodiment are the same as those other than steps S14 to S16 in the first embodiment and are therefore omitted.

At step S14A, the location-path-list edition unit 40A displays a file selection box 45 above the edition target table 41A as shown in FIG. 14. In step S15A, when the user presses a reference button in the file selection box 45 via the input device 18A, the location-path-list edition unit 40A causes a file-selection dialog box (not illustrated) to be displayed. The path of the CSV-format file created in the past is selected by the user via the dialog box. The comparing unit 44 causes the description of the CSV-format file of the selected path to be displayed in column D on the edition target table 41A, and detects a cell in which a value is present in only one of column B and column D on the edition target table 41A. Next, comparing unit 44 causes the character, the cell frame, and/or the background to be displayed in a form other than an ordinary form, for example, in a different color and/or to blink.

The configurations of the second embodiment, other than those discussed above are the same as those of the first embodiment.

According to the second embodiment, addition or deletion of a row or a change of an item name in column A is performed only on the specification and location-path list 20A. Accordingly, correction of data in the second embodiment is easier than correction of data in the first embodiment.

Additionally, the addition of a row is performed by the user copying the description of a cell in column D on the edition target table 41A and pasting it on a cell on the same row in column B.

Moreover, the user can easily ascertain how the tree structures of the individual models differ from one another by using the edition target table 41A.

While various aspects and embodiments have been disclosed herein, other aspects and embodiments are possible. Other designs may be used in which the above-described components are each present.

For example, the software-developing structured-data-file-creation support screen 22 shown in FIG. 6 may be omitted; the process from steps S3 to S7 may be sequentially connected to the process from steps S8 to S12 in the flowchart shown in FIG. 5, or furthermore, may be sequentially connected to the processes from step S13 to S19.

In other examples, there may be one or more models or software kinds. The software kind may be, for example, the category of the printer driver.

The edition target table 41 and/or 41A need not include the specification data in column C. The number of items (1 to 8 . . . ) in the left end column of the edition target table 41 and/or 41A may be smaller than the number of items of the specification list 20 shown in FIG. 2 so that edition target table 41 and/or 41A can easily be viewed at the editing stage. The edition target table 41 and/or 41A may include only necessary items, without a blank of the location path. In such a case, an item may be added.

The specification list 20 and the location-path list 30 may be configured such that a table of a relational database is used instead of the spreadsheet, and the description thereof is displayed as a data grid object. Furthermore, indices for identifying subtrees with the same structure may be added to location paths so that an XML file including subtrees with the same structure can be created.

The present disclosure can be applied to creation of a software-developing structured data file for a device other then the image forming apparatus.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A method for creating a software-developing structured data file, the method comprising:
    storing (i) a specification list, the specification list being a first spreadsheet comprising values associated with a plurality of items of specifications associated with a plurality of model names corresponding to a plurality of models of an image forming apparatus, wherein the plurality of items include at least one of a PDL, a paper size, a feeding paper, a reading resolution, and a printing speed, and (ii) a location-path list, the location-path list being a second spreadsheet comprising location paths of a plurality of software kinds associated with the plurality of items, wherein the location paths comprise a first tree structure and are set in common for the plurality of model names;
    displaying the plurality of model names included in the specification list;
    selecting one of the plurality of model names;
    displaying the plurality of software kinds included in the location-path list;
    selecting one of the plurality of software kinds;
    creating an edition target table by combining a column of the selected model name from the specification list and a column of the selected software kind from the location-path list, wherein the location paths corresponding to the selected model name are associated with corresponding values of respective items of specifications of the selected model name;
    displaying the edition target table;
    editing the location paths in the edition target table by at least one of writing and deleting a location path corresponding to the selected model name;
    storing the edited edition target table;
    bringing together common portions of all of the location paths in the edited edition target table into a second tree structure;
    creating a data file comprising an XML file by writing the values of the corresponding items to respective location paths for the selected model name; and
    storing the data file, wherein if a given item has a plurality of rows of values associated therewith in the specification list, the plurality of rows of values are set as values of text nodes of brother elements created in the XML file.

* * * * *